United States Patent [19]

Dellinger

[11] Patent Number: 5,694,753
[45] Date of Patent: Dec. 9, 1997

[54] PRUNING APPARATUS AND METHOD

[75] Inventor: Roger D. Dellinger, Prosser, Wash.

[73] Assignee: Battelle Memorial Institute, Richland, Wash.

[21] Appl. No.: 615,552

[22] Filed: Mar. 11, 1996

[51] Int. Cl.[6] ................................................. A01D 55/00
[52] U.S. Cl. .................................................. 56/234; 56/235
[58] Field of Search ............................ 56/13.6, 13.7, 56/13.8, 234, 235, 233, 237, 255, 295

[56] References Cited

U.S. PATENT DOCUMENTS

| 3,138,911 | 6/1964 | Pounds | 56/235 |
| 3,605,392 | 9/1971 | Fossum | 56/237 |
| 3,888,071 | 6/1975 | Wallace | 56/237 |
| 4,250,699 | 2/1981 | Hallberg | 56/235 |
| 4,302,922 | 12/1981 | Guerndt, Jr. et al. | 56/235 |
| 4,383,401 | 5/1983 | Lessard et al. | 56/236 |
| 4,455,815 | 6/1984 | Grant | 56/235 |
| 4,573,269 | 3/1986 | Hernandez | 56/235 X |
| 4,627,227 | 12/1986 | Dixon | 56/235 |
| 5,174,099 | 12/1992 | Matsuura | 56/255 X |
| 5,430,999 | 7/1995 | Grant | 56/235 X |

FOREIGN PATENT DOCUMENTS

1142043  2/1985  U.S.S.R. .

*Primary Examiner*—Terry Lee Melius
*Assistant Examiner*—Robert Pezzuto
*Attorney, Agent, or Firm*—Paul W. Zimmerman

[57] ABSTRACT

The present invention is an automated pruning apparatus that requires little or no follow-up hand pruning and requires no sensors to avoid supportive trunks or posts. The present invention uses at least one pair of flat, close angled toothed, counter rotating blades. Woody branches are directed to the counter rotating blades first with a lifting arm and secondly by a quilled drum.

15 Claims, 8 Drawing Sheets

PRUNING APPARATUS AND METHOD

This invention was made with Government support under Contract DE-AC06-76RLO 1830 awarded by the U.S. Department of Energy. The Government has certain rights in the invention.

FIELD OF THE INVENTION

The present invention is an apparatus and method for pruning vegetation having woody branches and is especially useful for grapevines. More specifically, the apparatus of the present invention has counter rotating pruning blades for shearing woody branches.

BACKGROUND OF THE INVENTION

Pruning of vegetation is desirable for aesthetic as well as economic reasons, particularly when producing a food crop. Pruning has been and still is done by hand. In the grape industry, most pruning of grape vines is still done manually with scissor-like pruning shears.

Automated pruning is done in some vineyards. A well known automated pruner is made by Agricultural Industrial Machinery, Inc. in the state of California, that incorporates cutting blades supplied by a French company, Pellenc. The Pellenc machine straddles a vine row and has rollers that come in contact beneath a vine support wire providing a high quality cut. However, control mechanisms are required so that the Pellenc rollers separate to avoid grape trunks and support posts. In addition, capital cost of the Pellenc is high.

Another automated pruner is known as the Blueline made by Anderson Equipment in Grandview, Wash. The Blueline is a tractor mounted sickle-bar and works like a hedger, but does not provide a precise clean cut and requires follow-up hand pruning.

Other machines have been made by individual vintners. One uses a zig-zag blade from a sickle-bar mounted vertically and rotated to provide an initial cut. These machines all require follow-up hand pruning.

SUMMARY OF THE INVENTION

It is an object of the present invention to provide an automated pruning apparatus that requires little or no follow-up hand pruning.

It is a further object of the present invention to provide an automated pruning apparatus requiring no sensors to avoid supportive trunks or posts.

These and other objects of the present invention are achieved by using at least one pair of flat, close angled toothed, counter rotating blades. Woody branches are directed to the counter rotating blades first with a lifting arm and secondly by a quilled drum.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF THE INVENTION

The apparatus of the present invention is an automated pruner for pruning woody branches, including but not limited to grape plant vines. Although the apparatus and its operation will be described in terms of pruning grape plant vines, it will be apparent to one skilled in the art that the invention has wider applicability to other types of hedges having woody branches. Individual elements of the apparatus will be first described followed by a description of the apparatus assembly.

Blade Pair

Figures 1A, 1B:
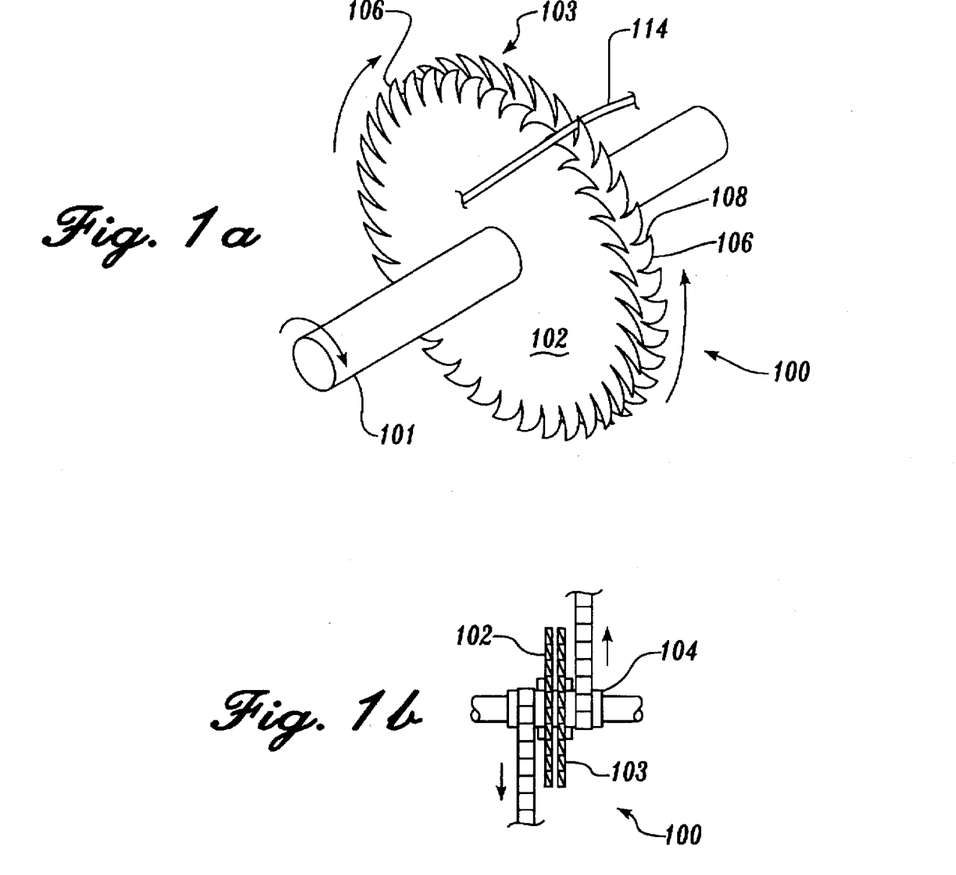
FIG. 1a is an isometric view of a blade pair.
FIG. 1b is a front view of a blade pair.
Figure 1C:
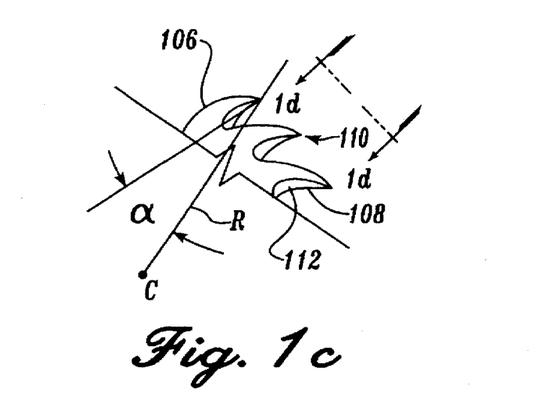
FIG. 1c is an isometric detail of blade teeth.
Figure 1D:
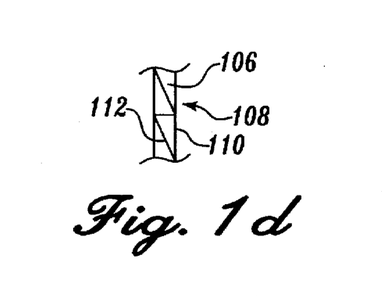
FIG. 1d is a top view detail of blade teeth.

The blade pair of the present invention is shown in FIG.'s 1a, 1b, 1c, and 1d. The blade pair 100 has a first blade 102 and a second blade 103. The first blade 102 is secured to a shaft 101 so that the first blade 102 rotates with the shaft 101. The second blade 103 is mounted on a bearing 104 (FIG. 1b) permitting rotation of the second blade 103 in an opposite direction to the first blade 101. Each blade 102, 103 has a plurality of teeth, each tooth 106 having a cutting edge 108. As shown in FIG. 1c, the cutting edge forms a closed angle alpha with a blade radius R. The closed angle alpha is greater than zero, preferably greater than about 5 degrees and most preferably about 15 degrees. The cutting edge 108 is defined by a flat side 110 and a wedge side 112 on the tooth 106. The first and second blades 102, 103 are mounted with flat sides 110 facing each other and in close proximity. Close proximity is defined as ranging from slidable contact to a gap between flat sides 110 up to about 1/16 inch. The blades 102, 103 may be rotated by any suitable mechanical rotation equipment. Sprocket and chain are preferred to impart maximum torque through the blades 102, 103 for shearing woody branches 114 (FIG. 1a). It is important that the blades 102, 103 shear through the full cross section of the woody branch 114. The blades 102, 103, including the teeth 106, are substantially flat meaning that the teeth 106 do not extend laterally beyond the side of the blade 102, 103 as do saw teeth. The cutting action of the blades 102, 103 predominately approximates the cutting action of manually operated pruning shears. However, if branches are not quite drawn into the teeth 106 some saw-like cutting occurs.

Quilled Drum

Figure 2A:
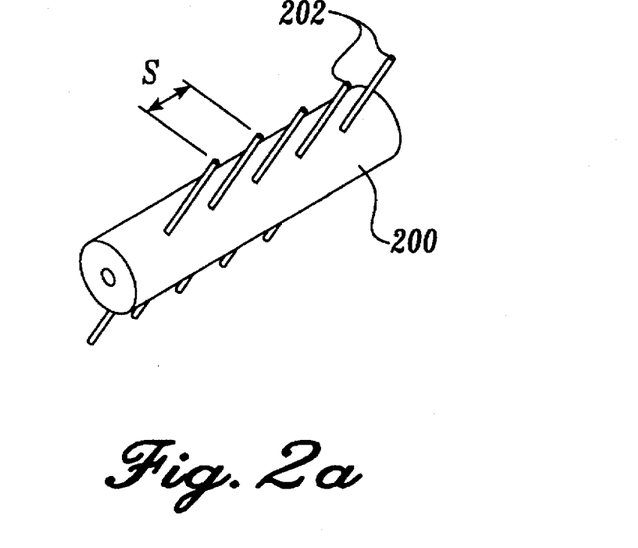
FIG. 2a is an isometric view of a quilled drum with quills on a longitudinal line.
Figure 2B:
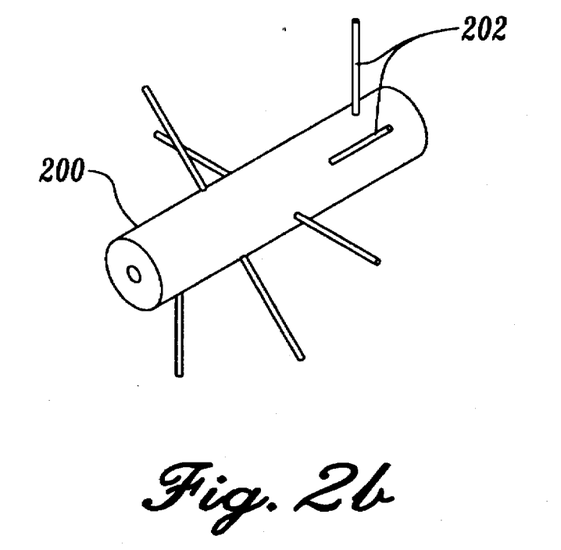
FIG. 2b is an isometric view of a quilled drum with quills on a helical line.

The quilled drum of the present invention has the purpose of drawing the woody branches toward the blade pair. Referring to FIG.'s 2a and 2b, the quilled drum has a drum 200 with quills 202. The drum may be of any cross sectional shape, but is preferably cylindrical as shown. The quills may be made of any flexible material, but are preferably synthetic rubber rods, for example the rods used on orchard sweepers and other farm implements. The quills 202 may be arranged on a line parallel to the axis of the drum 200 (FIG. 2a) or on a non-parallel line on the surface of the drum 200 (FIG. 2b). It is preferred that the quills 202 be on a helical line on the surface of the drum 200 as shown in FIG. 2b.

Quill spacing S should accommodate the largest diameter woody branch expected and ideally should accommodate more than one average sized woody branch. The quill spacing S is a function of the forward speed of the tractor and the rotational speed of the drum. The object is for the quilled drum 200 to draw woody branches to the blade pairs 100 where the woody branches are cut and stress on the plant is relieved. It is desired to avoid tearing woody branches from the plant. It has been found that for a tractor speed from about 1 mile per hour to about 3 miles per hour and drum rotation of from about 10 RPM to about 200 RPM, quill spacing S is preferably from about 2 inches to about 6 inches. For grapevine pruning, the quill spacing S is preferably about 3 inches. The number of rows of quills 202 are preferably few to prevent tangling and binding of the woody branches with the quills 202. At least one row is needed and two rows are preferred.

Quills 202 are mounted in the drum 200 by press fit into holes in the drum 200. The drum 200 may be made of any material, but is advantageously made from schedule 40 PVC pipe. The pipe is preferably from about 4 inches to about 6 inches nominal diameter.

For pruning grape plants, the quilled drum 200 is preferably oriented with its longitudinal axis parallel to the ground. This is because a portion of grape plant woody branches extend both forward and reverse parallel to the ground and parallel to the direction of the tractor. With the quilled drum 200 in a horizontal position parallel with the ground, the quills move perpendicularly to the forward and reverse oriented woody branches and therefore have the opportunity to lift both forward and reverse growing woody branches. In a vertical position, the drum surface would be moving in the same direction as the orientation of either forward or reverse oriented woody branches and the quills would likewise be moving parallel to the forward or reverse woody branches and would fail to draw all or a portion of them toward the blade pair(s) 100.

The quilled drum 200 may not draw suckers toward the blade pairs 100.

Precutter

A precutter is preferably employed simulating an initial cut. The precutter may be a sickle-bar, but is preferably a second blade pair and most preferably a set of three second blade pairs.

Lifting Arm

Figure 3A:
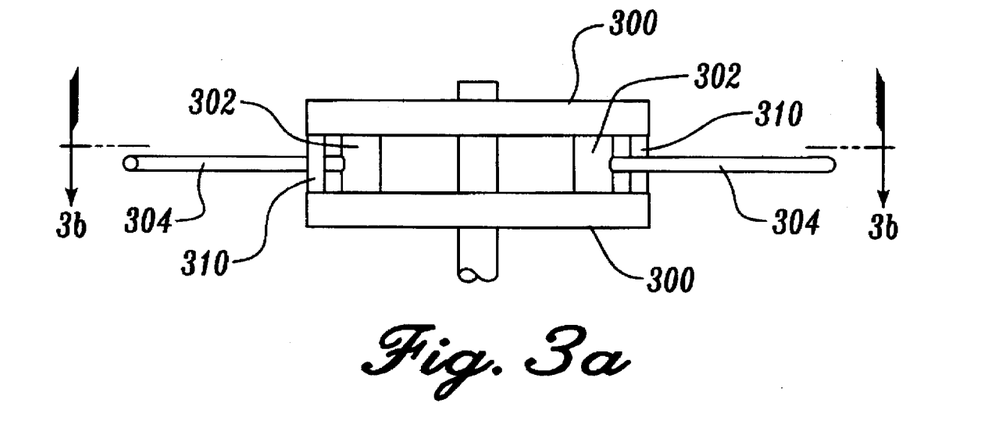
FIG. 3a is a side view of a lifting arm.
Figure 3B:
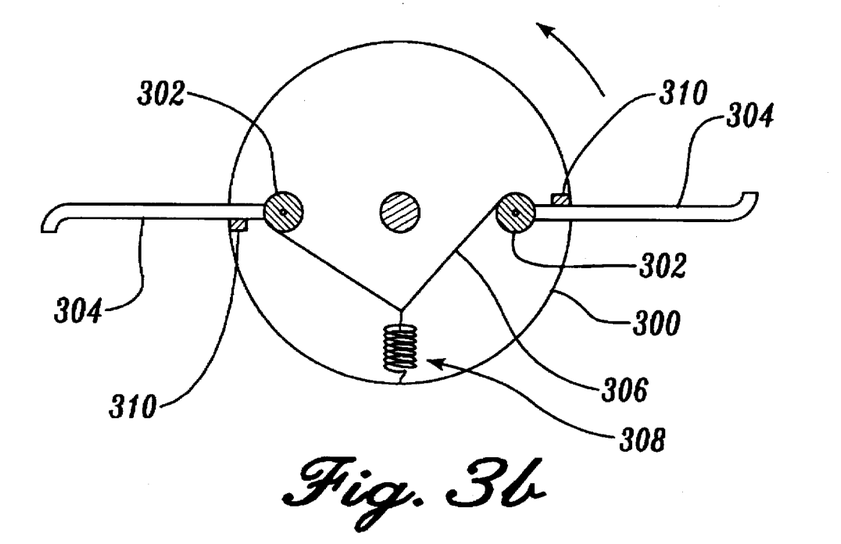
FIG. 3b is a section view of a lifting arm.

A lifting arm is needed to lift hanging woody branches toward the precutter. The lifting arm is transversely mounted on the front of an apparatus assembly. Details of the lifting arm are shown in FIG.'s 3a and 3b. For a tractor mounted apparatus assembly, the only item that reaches under the vines is the lifting arm. The blade pair, quilled drum and precutter are kept near the periphery of the vines or plants. Hence, the lifting arm is the only element that comes in contact with vine or plant trunks and supportive posts.

The lifting arm is made from two parallel plates 300 with rotatable spacers 302. Lifters 304 are rotatably mounted to the rotatable spacers 302. A cable 306 is rotatably connected to each of the rotatably spacers 302 and loaded with a spring 308. Stops 310 prevent rotation of the lifters 304 in the same direction as the lifting arm. In operation, when a lifter 304 contacts a trunk or post, it will rotate about the rotatable spacer 302 in a direction opposite the lifting arm and simultaneously put tension on the cable 306. The tensioned cable 306 will urge the other lifter 304 against its spacer 310 and stiffen the lifter 304 so as to prevent or minimize dropping woody branches while the first lifter 304 clears the trunk or post. The lifting arm may not draw suckers toward the precutter.

Apparatus Assembly

Figure 4:
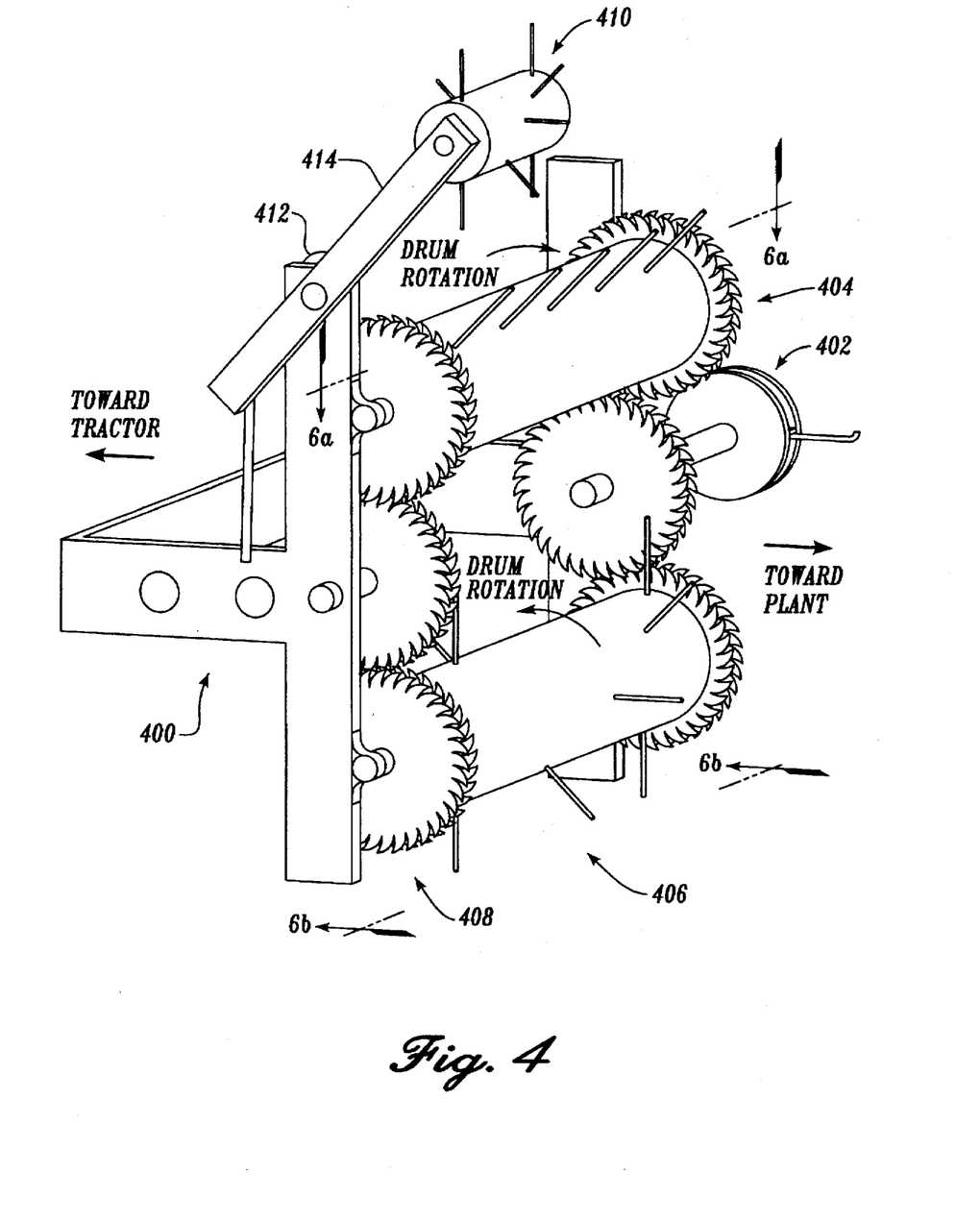
FIG. 4 is an isometric view of an apparatus assembly.
Figure 5:
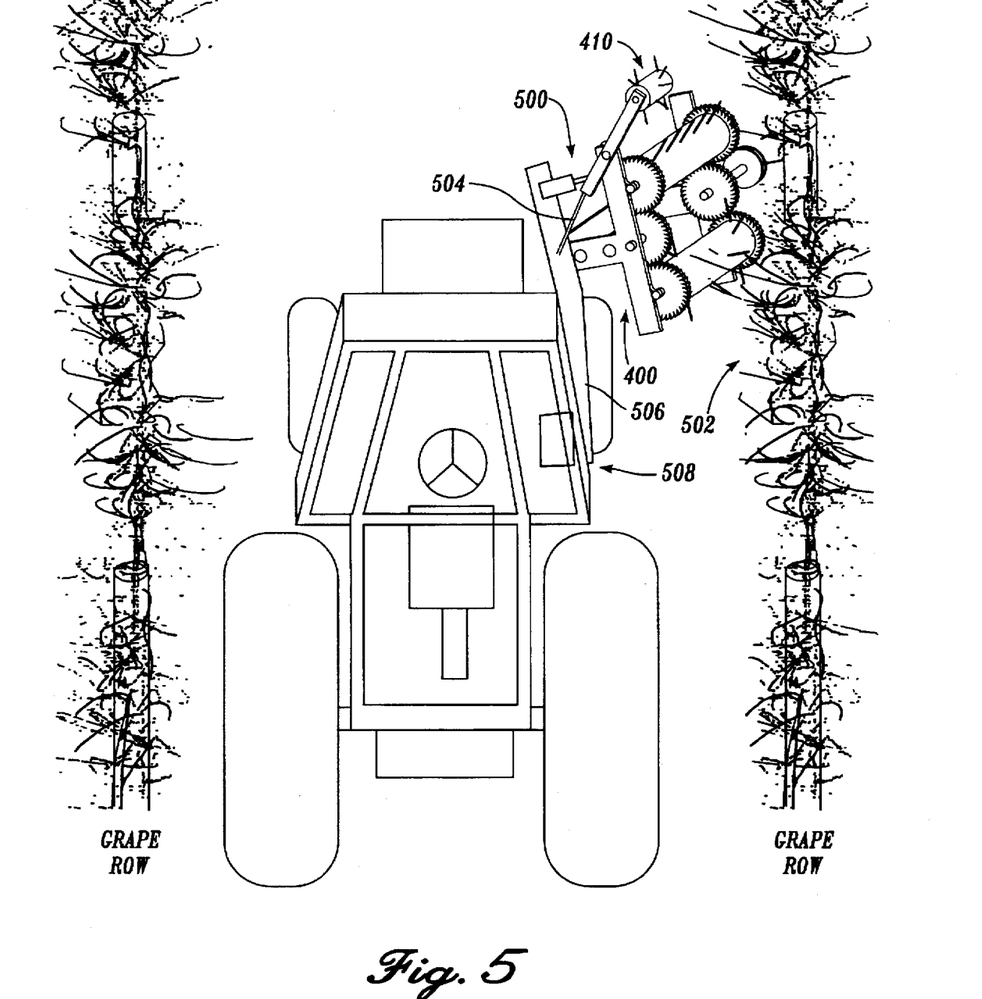
FIG. 5 is an aerial view of the apparatus assembly mounted on a tractor.

An apparatus assembly is shown in FIG.'s 4 and 5. A frame 400 is provided for mounting to a tractor and supporting the elements of the apparatus assembly. At the front of the apparatus assembly is the lifting arm 402. The lifting arm 402 brings woody branches toward the precutter 404. Cut and uncut woody branches are engaged by the quilled drums 406. Cut branches are drawn through the assembly toward the tractor by the rotation of the quilled drums 406. Uncut branches are urged against blade pairs 408 by the forward motion of the tractor and the rotation of the quilled drums 406.

An additional quilled drum 410 is used especially for wine grape plants having woody branches extending upwardly from the plant. The additional quilled drum 410 is powered from a chain driven sprocket 412 that is connected to a pulley and belt (not shown) within the support arm 414.

In FIG. 5, an adjusting arm 500 is shown for tilting the frame 400 as needed to conform to the contour of the plant 502. When an additional drum 410 is employed, it is desirable to maintain its orientation with respect to the plant 502 as the frame 400 is tilted. This is accomplished with an additional arm 504 connected to a mounting frame 506. Hydraulic controls (not shown) are located at a reverse end 508 of mounting frame 506 so that they are accessible to the tractor driver.

Figure 6A:
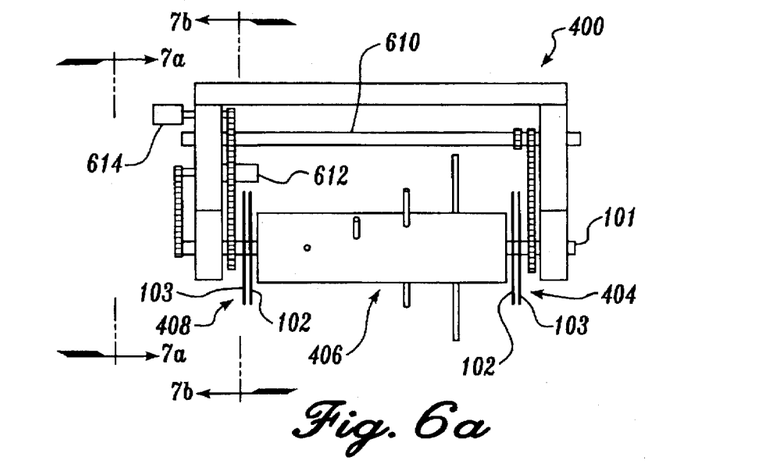
FIG. 6a is a top view of the apparatus assembly.
Figure 6B:
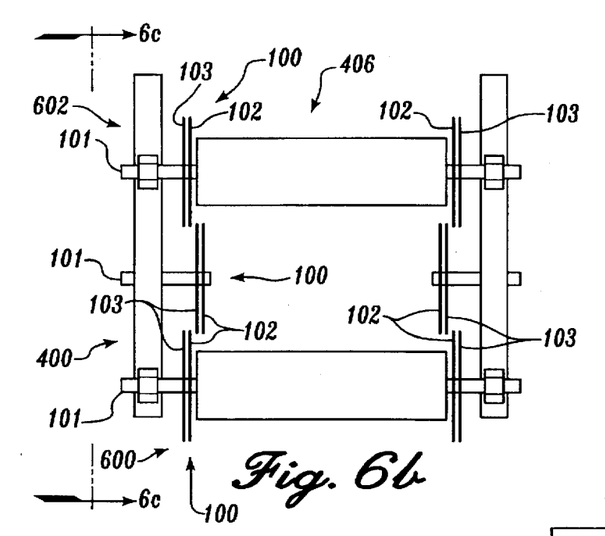
FIG. 6b is a front view of the apparatus assembly.
Figure 6C:
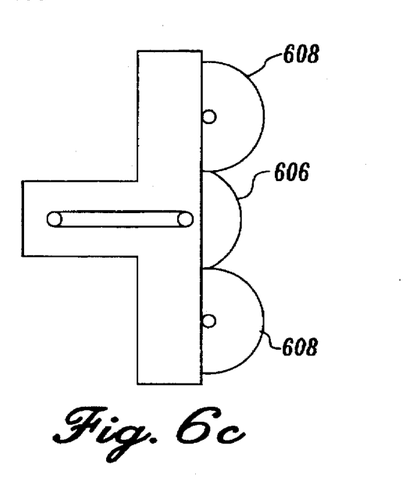
FIG. 6c is a side view of the apparatus assembly.

Further details of the apparatus assembly are shown in FIG.'s 6a, 6b and 6c. Specifically, in FIG. 6b, blade pairs 100 are staggered so that the blade pairs 100 overlap and provide a continuous cutting surface from the bottom 600 of the frame 400 to the top 602 of the frame 400. In FIG. 6c, the center blade pair 606 is either center offset or of smaller diameter compared to outer blade pairs 608 providing a contoured cutting surface. Referring now to FIG. 6a and 6b, first blades 102 and quilled drum 406 are attached to and rotate with a first shaft 101. Second blades 103 are mounted on bearings (not shown) and rotate via chain drive with a second shaft 610. The first shaft(s) 101 are driven with motor 612. The second shaft 610 is driven with motor 614. It will be apparent to one skilled in the art that multiple motors, belt and pulley, or other mechanical drive may be used. However, the chain drive with hydraulic motors 612, 614 is preferred for positive displacement and high torque for shearing woody branches. To avoid damage to the plant, the hydraulic motors 612, 614 are provided with a relief valve and hydraulic fluid bypass. Upon reaching a predetermined pressure, the relief valve opens and the hydraulic motors 612, 614 stop turning. Other load limiting mechanisms may be used as are common to one skilled in the art of load limiting.

The first and second shafts 101, 610 are rotated in opposite directions. In one embodiment, the second shaft was stationary, but in operation, branches skipped over the stationary blade(s). Hence, by rotating both blades 102, 103 in a blade pair 100, the blade pair 100 was effective in separating, aligning, and cutting the woody branches.

The first shaft is operated from about 20 to 200 RPM, preferably from about 50 to 100 RPM and has been tested by operation at about 100 RPM. The second shaft is operated from about 20 to 1000 RPM, preferably from about 50 to 700 RPM, and has been tested at about 700 RPM.

It should be noted that the middle blade pair 616 is on the forward end of the apparatus assembly and both blades are driven by the second motor, but in a counter rotating relationship.

Figure 7A:
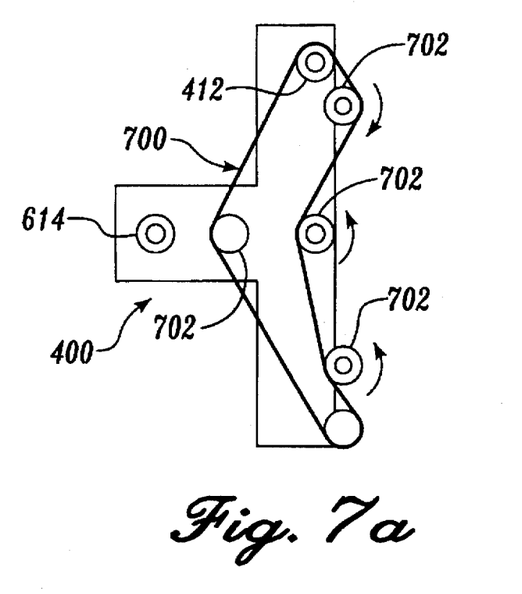
FIG. 7a is a side view of a first drive.
Figure 7B:
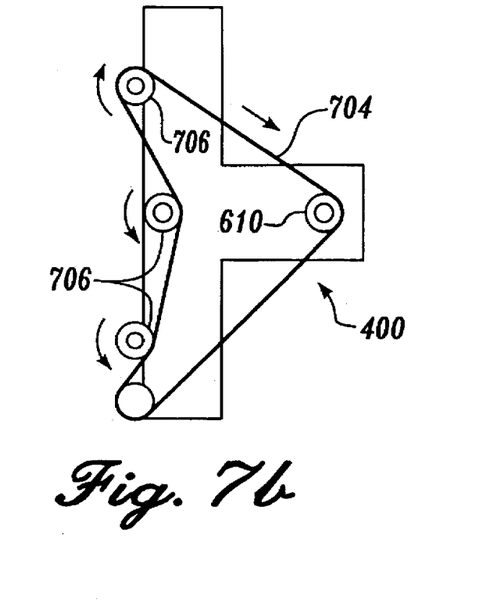
FIG. 7b is a side view of a second drive.

A preferred embodiment of the chain drive is shown in FIG.'s 7a and 7b. In FIG. 7a, the first drive is shown with chain 700 travelling over sprockets 702 that turn shafts 101. In FIG. 7b, the second drive is shown with chain 704 travelling over sprockets 706 that turns the second blades 103.

Figure 8:
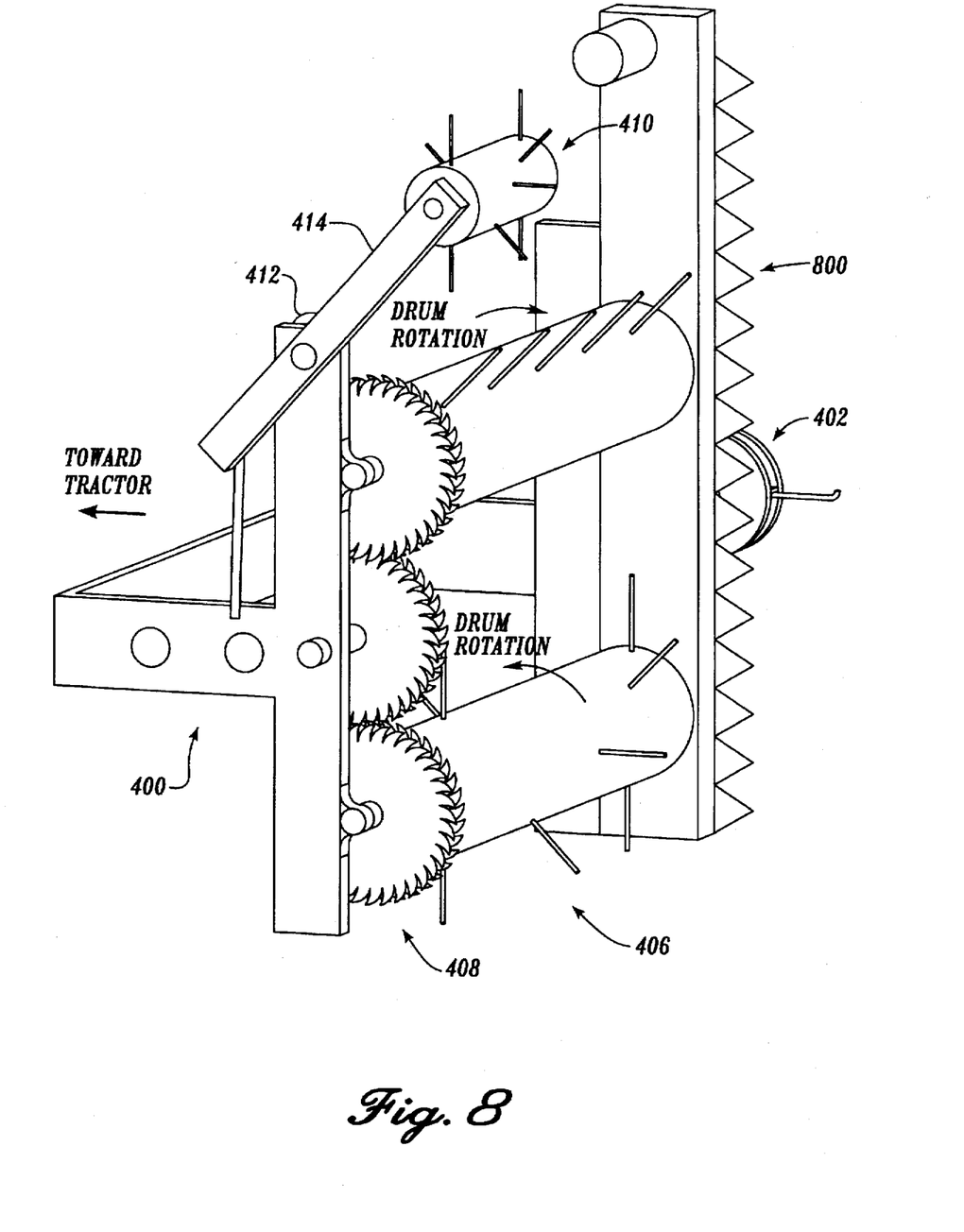
FIG. 8 is an isometric view of an alternative embodiment of the apparatus assembly.

An alternative embodiment is shown in FIG. 8 wherein the precutter is a sickle-bar 800.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An apparatus for pruning woody branches, comprising:
   (a) a first blade pair of a first blade and a second blade, each having a plurality of teeth, each tooth having a cutting edge, said cutting edge defined by a flat side and a wedge side on said tooth;
   (b) said first blade secured to a shaft so that the first blade rotates with the shaft, said second blade mounted on a bearing permitting rotation of said second blade in an opposite direction to said first blade; and
   (c) said first and second blades mounted with flat sides of said first and second blades facing each other and in close proximity;
   (d) a frame supporting said shaft; and
   (e) a quilled drum attached to the frame and ahead of the first blade pair for drawing the woody branches toward said first blade pair.

2. The apparatus as recited in claim 1, further comprising: a precutter mounted on the frame ahead of the quilled drum for cutting self supporting extended woody branches.

3. The apparatus as recited in claim 2, further comprising: a lifting arm mounted on the frame ahead of the precutter for lifting drooping woody branches toward said precutter.

4. The apparatus as recited in claim 2, wherein said precutter is a sickle-bar.

5. The apparatus as recited in claim 2, wherein said precutter is at least one second blade pair.

6. The apparatus as recited in claim 3, further comprising: a plurality of shafts each having a quilled drum with two of said first blades, each said first blade mounted on opposite ends of the quilled drum, each of said plurality of shafts further having a sprocket driven by a first chain attached to a first hydraulic motor; and a plurality of said second blades proximate to said first blades and forming a plurality of blade pairs, each of said plurality of second blades having a second sprocket attached to a second chain driven by a second hydraulic motor.

7. The apparatus as recited in claim 6, wherein the plurality of blade pairs is arranged to provide a contoured cutting surface.

8. The apparatus as recited in claim 6, wherein the plurality of blade pairs is arranged to provide a continuous cutting surface from a bottom of the frame to a top of the frame.

9. An apparatus for pruning woody branches, comprising:
   a frame mounted on a tractor, said frame having a front end and a back end;
   a lifting arm mounted transversely on the front end for lifting hanging woody branches; toward
   a precutter mounted on the front end and behind the lifting arm, said precutter cuts a portion of the hanging woody branches;
   a quilled drum mounted between the front end and back end for drawing remaining uncut woody branches; toward
   a first blade pair mounted on the back end behind the quilled drum, said blade pair cuts the remaining woody branches.

10. The apparatus as recited in claim 9, wherein said first blade pair comprises:
    (a) a first blade and a second blade, each having a plurality of teeth, each tooth having a cutting edge, said cutting edge forming a closed angle with a blade radius, said cutting edge defined by a flat side and a wedge side on said tooth;
    (b) said first blade secured to a shaft so that the first blade rotates with the shaft, said second blade mounted on a bearing permitting rotation of said second blade in an opposite direction to said first blade; and
    (c) said first and second blades mounted with flat sides of said first and second blades facing each other and in close proximity.

11. The apparatus as recited in claim 9, wherein said precutter is a sickle-bar.

12. The apparatus as recited in claim 9, wherein said precutter is a second blade pair.

13. The apparatus as recited in claim 10, further comprising:
    a plurality of shafts each having a quilled drum with two first blades, each first blade mounted on opposite ends of the quilled drum, each of said plurality of shafts further having a sprocket driven by a first chain attached to a first hydraulic motor; and
    a plurality of second blades proximate to said first blades and forming a plurality of blade pairs, each of said plurality of second blades having a second sprocket attached to a second chain driven by a second hydraulic motor.

14. The apparatus as recited in claim 10, wherein the plurality of blade pairs is arranged to provide a contoured cutting surface.

15. The apparatus as recited in claim 10, wherein the plurality of blade pairs is arranged to provide a continuous cutting surface from a bottom of the frame to a top of the frame.

* * * * *